(12) United States Patent
Katsunoi (10) Patent No.: US 9,609,173 B2
(45) Date of Patent: Mar. 28, 2017

(54) MEMORY CONTROL CIRCUIT AND IMAGE FORMING APPARATUS

(71) Applicant: Ichiro Katsunoi, Kanagawa (JP)

(72) Inventor: Ichiro Katsunoi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/923,596

(22) Filed: Oct. 27, 2015

(65) Prior Publication Data
US 2016/0127613 A1 May 5, 2016

(30) Foreign Application Priority Data
Oct. 30, 2014 (JP) .................................. 2014-221790

(51) Int. Cl.
| H04N 1/64 | (2006.01) |
| H04N 1/60 | (2006.01) |
| H04N 1/52 | (2006.01) |
| H04N 1/46 | (2006.01) |

(52) U.S. Cl.
CPC ..................... H04N 1/46 (2013.01)

(58) Field of Classification Search
CPC ........ H04N 1/648; H04N 1/52; H04N 1/6008; H04N 1/46
USPC ........................................................ 358/1.16
See application file for complete search history.

(56) References Cited

U.S. PATENT DOCUMENTS

| 6,081,687 A * | 6/2000 | Munemori | G03G 15/23 358/300 |
| 7,532,348 B2 * | 5/2009 | Yaguchi | H04N 1/32358 358/1.15 |
| 8,285,185 B2 * | 10/2012 | Sasaki | G03G 15/2053 399/333 |
| 8,477,324 B2 | 7/2013 | Miyagi | |
| 2006/0216053 A1 * | 9/2006 | Shimazawa | G03G 15/5016 399/80 |
| 2010/0060917 A1 * | 3/2010 | Watanabe | H04N 1/56 358/1.9 |
| 2012/0099147 A1 * | 4/2012 | Tanaka | G06F 3/1206 358/1.15 |
| 2014/0293354 A1 * | 10/2014 | Itoh | G06K 15/1886 358/1.16 |
| 2015/0077801 A1 | 3/2015 | Katsunoi | |

FOREIGN PATENT DOCUMENTS

JP    2006-237856    9/2006

* cited by examiner

Primary Examiner — Allen H Nguyen
(74) Attorney, Agent, or Firm — IPUSA, PLLC (57) ABSTRACT

A memory control circuit includes a writing unit configured to receive image data that is input and write the image data into a memory; a first reading unit configured to read the image data written in the memory and output the image data to a determination unit that determines a type of image of the image data; and a second reading unit configured to read the image data written in the memory and output the image data to an image processing unit that performs image processing according to a determination result obtained by the determination unit. When the second reading unit is outputting the image data to the image processing unit, the first reading unit outputs image data, which is input subsequently to the input of the image data, to the determination unit.

21 Claims, 10 Drawing Sheets

MEMORY CONTROL CIRCUIT AND IMAGE FORMING APPARATUS

BACKGROUND OF THE INVENTION

1. Field of the Invention

The present invention relates to a memory control circuit and an image forming apparatus for controlling the writing and the reading of image data with respect to a memory.

2. Description of the Related Art

Conventionally, there is known an image forming apparatus having an ACS (Auto Color Selection) function for determining whether the image of an original document read by a scanner is a color image or a monochrome image.

In a conventional image forming apparatus, for example, in a copy process, etc., when storing image data of an image read from an original document in an image memory, the determination result obtained by the ACS function is written into the header of the image data. Then, the conventional image forming apparatus reads the stored image data from the image memory, and performs image processing according to the determination result obtained by the ACS function.

In a conventional image forming apparatus, before performing image processing, the image data including the determination result obtained by the ACS function is stored, and therefore it takes time until the image processing is performed, which may decrease the productivity.

Patent Document 1: Japanese Laid-Open Patent Publication No. 2006-237856

SUMMARY OF THE INVENTION

The present invention provides a memory control circuit and an image forming apparatus, in which one or more of the above-described disadvantages are eliminated.

According to an aspect of the present invention, there is provided a memory control circuit including a writing unit configured to receive image data that is input and write the image data into a memory; a first reading unit configured to read the image data written in the memory and output the image data to a determination unit that determines a type of image of the image data; and a second reading unit configured to read the image data written in the memory and output the image data to an image processing unit that performs image processing according to a determination result obtained by the determination unit, wherein when the second reading unit is outputting the image data to the image processing unit, the first reading unit outputs image data, which is input subsequently to the input of the image data, to the determination unit.

According to an aspect of the present invention, there is provided an image forming apparatus including a memory control circuit including a writing unit configured to receive image data that is input and write the image data into a memory, a first reading unit configured to read the image data written in the memory and output the image data to a determination unit that determines a type of image of the image data, and a second reading unit configured to read the image data written in the memory and output the image data to an image processing unit that performs image processing according to a determination result obtained by the determination unit, wherein when the second reading unit is outputting the image data to the image processing unit, the first reading unit outputs image data, which is input subsequently to the input of the image data, to the determination unit.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

First Embodiment

Figure 1:
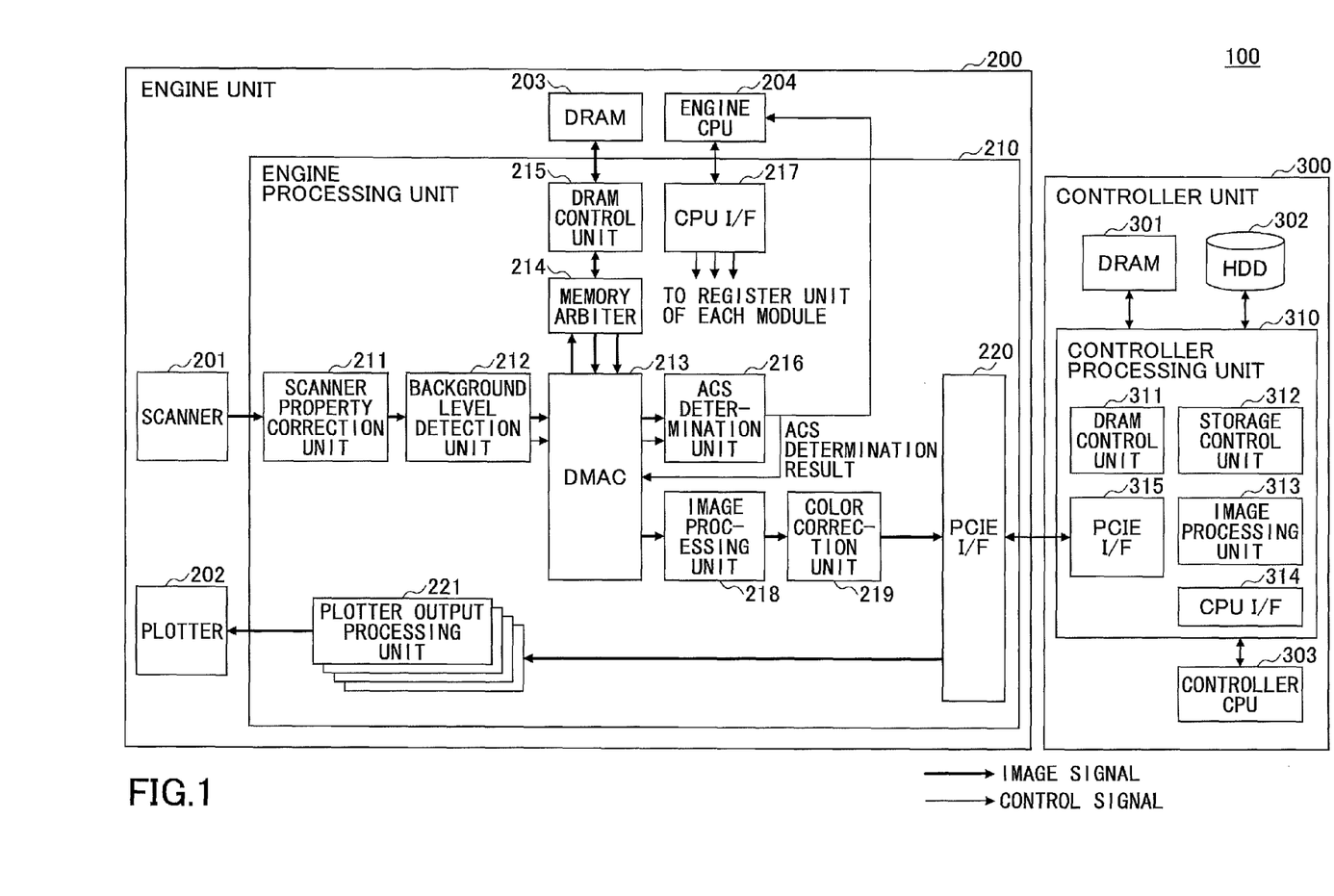
FIG. 1 illustrates an image forming apparatus according to a first embodiment.

A description is given, with reference to the accompanying drawings, of embodiments of the present invention. FIG. 1 illustrates an image forming apparatus according to a first embodiment.

An image forming apparatus 100 according to the present embodiment includes an engine unit 200 and a controller unit 300. The engine unit 200 is controlled by the controller unit 300. The engine unit 200 and the controller unit 300 according to the present embodiment are respectively substrates on which a circuit for realizing the units described below is mounted.

First, a description is given of the engine unit 200 according to the present embodiment. The engine unit 200 according to the present embodiment includes a scanner 201, a plotter 202, a DRAM (Dynamic Random Access Memory) 203, an engine CPU (Central Processing Unit) 204, and an engine processing unit 210.

In the engine unit 200 according to the present embodiment, the scanner 201 reads an image of an original document, and outputs the read image data to the engine processing unit 210. The plotter 202 uses the image data output from the engine processing unit 210 to perform image forming, and outputs the image. The DRAM 203 stores the image data read by the scanner 201, via the engine processing unit 210. The engine CPU 204 controls the units included in the engine processing unit 210.

The engine processing unit 210 according to the present embodiment includes a scanner property correction unit 211, a background level detection unit 212, a DMAC (Direct Memory Access Controller) 213, a memory arbiter 214, and a DRAM control unit 215. Furthermore, the engine processing unit 210 includes an ACS (Auto Color Selection) determination unit 216, a CPU interface 217, an image processing unit 218, a color correction unit 219, a PCIE (PCI Express) interface 220, and a plotter output processing unit 221.

The scanner property correction unit 211 makes corrections according to the properties of the scanner 201. Specifically, the scanner property correction unit 211 performs processes such as shading correction, γ conversion, a filter process, and color conversion. Note that the color conversion performed by the scanner property correction unit 211 is not a conversion from RGB to CMYK, but a conversion from RGB to RGB.

The background level detection unit 212 detects the background density of the original document image, and transfers the value of the detected value of the background level to the DMAC 213 described below.

The DMAC 213 controls the reading and writing of image data with respect to the DRAM 203. The DMAC 213 according to the present embodiment receives input of the image data output from the background level detection unit 212, and outputs the image data stored in the DRAM 203 to the ACS determination unit 216 and the image processing unit 218. That is, with respect to the input and output of image data, the DMAC 213 according to the present embodiment includes one input system and two output systems, and performs the output of image data to the ACS determination unit 216 and the output of image data to the image processing unit 218, in parallel. Details of the DMAC 213 according to the present embodiment are described below.

The memory arbiter 214 secures the path used for writing and reading image data with respect to the DMAC 213. The DRAM control unit 215 controls the DRAM 203.

The ACS determination unit 216 determines whether the image read by the scanner 201 is a color image or a monochrome image, based on the image data and the value of the background level output from the DMAC 213. That is, the ACS determination unit 216 according to the present embodiment is included in the determination unit for determining the type of the image of the image data.

The CPU interface 217 is an interface between the engine CPU 204 and other units.

The image processing unit 218 performs image processing with respect to the image data output from the DMAC 213, based on the determination result obtained by the ACS determination unit 216.

A color image is, for example, a photograph, a halftone dot image, etc., and importance is placed on the gradation. A monochrome image is, for example, characters, a document image, etc., and importance is placed on the contrast in the density between the background part and the image part, and the sharpness of the edges. Therefore, when the read image is a color image, the image processing unit 218 performs image processing for color output on the image, and when the read image is a monochrome image, the image processing unit 218 performs image processing for monochrome output on the image.

Specifically, the image processing unit 218 is an assembly of image processing modules for performing various kinds of image processing on the input image data. For example, the image processing unit 218 includes a background correction module for performing image density correction according to the background level detected by the background level detection unit 212, a γ correction module for performing γ correction on image data according to the properties of the scanner, a filter for changing the frequency properties such as edge enhancement and smoothing, etc.

The color correction unit 219 converts a color space of the scanner into a predetermined color space. The color correction unit 219 according to the present embodiment performs a color correction process by parameters of image processing based on the determination result obtained by the ACS determination unit 216. When the determination result is color, the color correction unit 219 generates image data of each of the colorplates of CMYK for a color image. Furthermore, when the determination result is monochrome, the color correction unit 219 generates image data of the K colorplate for a monochrome image.

The PCIE interface 220 transfers the image data that has undergone the image correction by the color correction unit 219, to the controller unit 300.

The plotter output processing units 221 are provided for the respective colors of CMYK, and send, to the plotter 202, the respective image data items of CMYK generated by the color correction unit 219. Note that the plotter output processing unit 221 according to the present embodiment has a built-in DMAC (Direct Memory Access Controller).

The controller unit 300 according to the present embodiment includes a DRAM 301, a HDD (Hard Disk Drive) 302, a controller CPU 303, and a controller processing unit 310. The DRAM 301 and the HDD 302 store image data, etc., transferred from the engine unit 200. The controller CPU 303 controls the units included in the controller processing unit 310 described below.

The controller processing unit 310 includes a DRAM control unit 311, a storage control unit 312, an image processing unit 313, a CPU interface 314, and a PCIE interface 315.

The DRAM control unit 311 controls the DRAM 301. The storage control unit 312 stores data in the HDD 302 and reads data from the HDD 302. The image processing unit 313 performs a magnification process, a gradation process, etc., on the image data.

The CPU interface 314 is an interface between the controller processing unit 310 and the controller CPU 303, and receives various control signals, etc., from the controller CPU 303. The PCIE interface 315 is an interface between the controller processing unit 310 and the engine unit 200, and receives image data from the engine unit 200.

Figure 2:
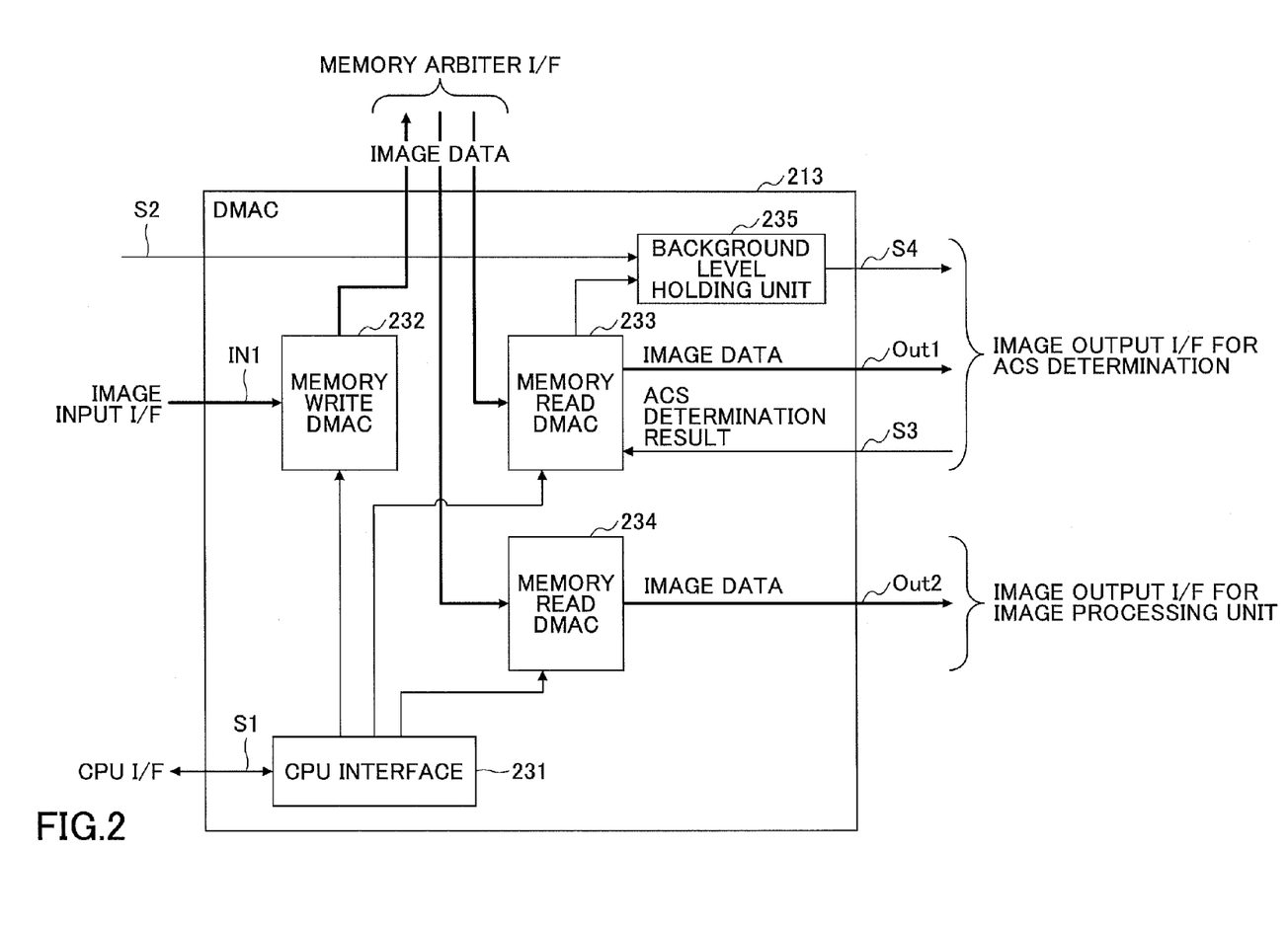
FIG. 2 illustrates a DMAC according to the first embodiment.

Next, a description is given of the DMAC 213 according to the present embodiment. FIG. 2 illustrates the DMAC 213 according to the first embodiment.

The DMAC 213 includes a CPU interface 231, a memory write DMAC 232, memory read DMACs 233, 234, and a background level holding unit 235.

The DMAC 213 according to the present embodiment controls the writing (storing) of image data in the DRAM 203, and the reading of image data stored in the DRAM 203. That is, the DMAC 213 according to the present embodiment fulfills the role of a memory control circuit.

Furthermore, the DMAC 213 according to the present embodiment includes input terminals IN1, S1, S2, S3, and output terminals Out1, Out2, S4.

From the input terminal IN1, image data output from the background level detection unit 212 is input. The input image data is supplied to the memory write DMAC 232.

From the input terminal S1, control signals are input via the CPU interface 217. These control signals include general parameters relevant to DMA (Direct Memory Access). General parameters are, for example, an instruction to activate DMAC, the data transfer amount, a start memory address of the DRAM 203, etc.

From the input terminal S2, a value of the background level detected by the background level detection unit 212 is input. The value of the background level is held in the background level holding unit 235. From the input terminal S3, the determination result obtained by the ACS determination unit 216 is input. The determination result is reported to the memory read DMAC 233.

From the output terminal Out1, the image data read from the DRAM 203 by the memory read DMAC 233 is output. The image data output from the output terminal Out1 is supplied to the ACS determination unit 216.

From the output terminal Out2, the image data read from the DRAM 203 by the memory read DMAC 234 is output. The image data output from the output terminal Out2 is supplied to the image processing unit 218.

From the output terminal S4, the value of the background level held in the background level holding unit 235 is output. The value of the background level is supplied to the ACS determination unit 216.

For example, the CPU interface 231 according to the present embodiment receives an image forming instruction from the controller unit 300, activates the memory write DMAC 232, the memory read DMAC 233, and the memory read DMAC 234, and sets various parameters.

When image data is input from the input terminal IN1, the memory write DMAC 232 writes this image data into the DRAM 203. That is, the memory write DMAC 232 according to the present embodiment is a writing unit that receives the input image data and writes the image data into the memory.

The memory read DMAC 233 receives an activation instruction from the engine CPU 204 via the CPU interface 231, reads the image data stored in the DRAM 203, and supplies the image data to the ACS determination unit 216. Therefore, the memory read DMAC 233 according to the present embodiment is a first reading unit that reads the image data written in the memory, and outputs the image data to the determination unit that determines the type of the image of the image data.

Furthermore, the memory read DMAC 233 according to the present embodiment receives an activation instruction, and causes the background level holding unit 235 to output a value of the background level. The output value of the background level is reported to the ACS determination unit 216. Therefore, the ACS determination unit 216 according to the present embodiment is able to perform ACS determination by using the image data and the value of the background level of the image. Thus, the ACS determination unit 216 according to the present embodiment is able to determine whether the image is a color image or a monochrome image including the color of the background of the original document, and the precision of determination can be increased.

The memory read DMAC 234 according to the present embodiment receives an activation instruction from the engine CPU 204 via the CPU interface 231, reads the image data stored in the DRAM 203, and supplies the image data to the image processing unit 218. That is, the memory read DMAC 234 according to the present embodiment is a second reading unit that reads the image data written in the memory, and outputs the image data to the image processing unit that performs image processing according to the determination result obtained by the determination unit.

The background level holding unit 235 temporarily holds the value of the background level detected by the background level detection unit 212. The background level holding unit 235 outputs the value of the background level to the ACS determination unit 216, according to an instruction from the memory read DMAC 233.

Figure 3:
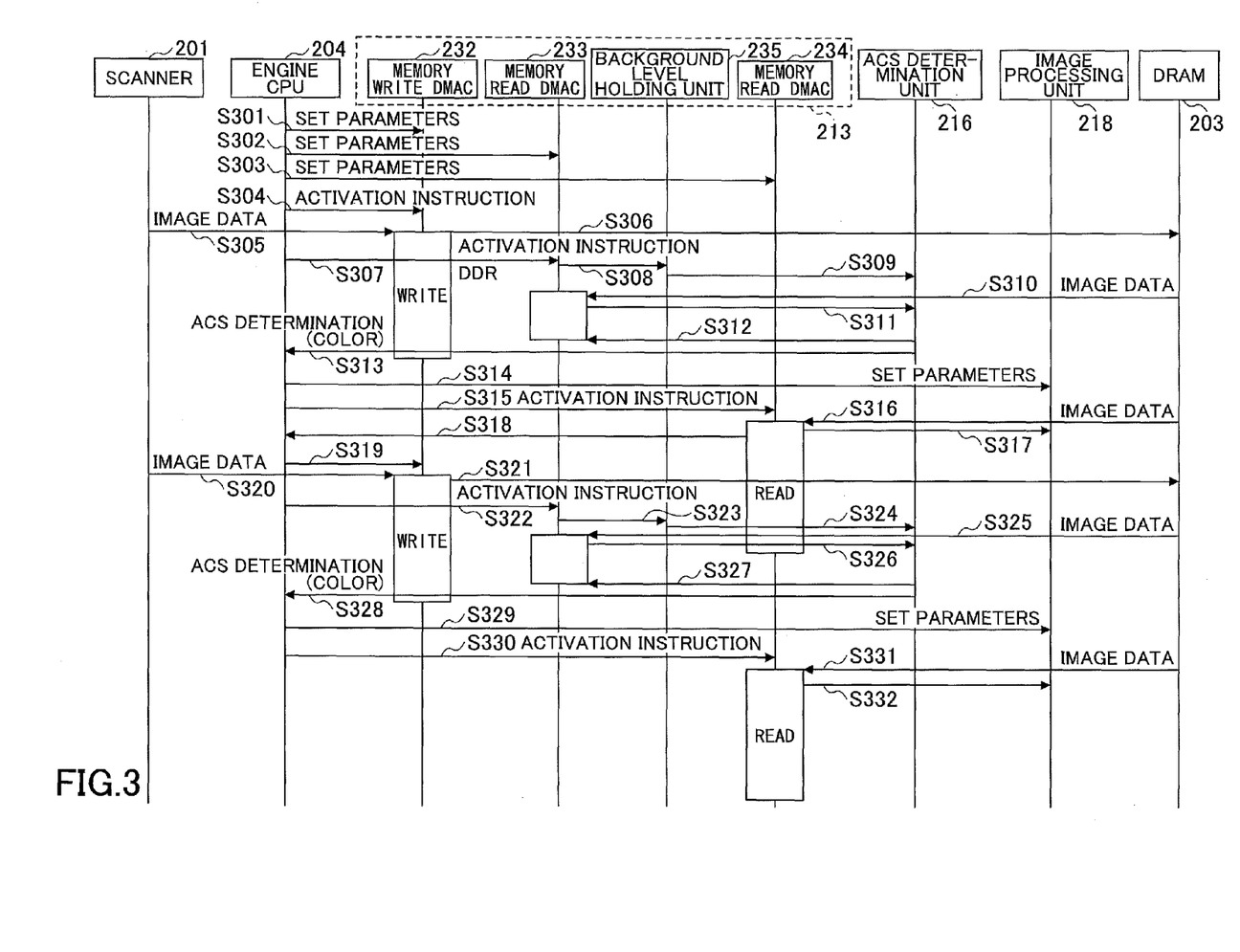
FIG. 3 is a first sequence diagram for describing the operations of an engine unit according to the first embodiment.

In the following, a description is given of operations of the engine unit 200 according to the present embodiment. First, with reference to FIG. 3, a description is given of a process performed by the engine unit 200, when the image forming apparatus 100 performs copying of a color original document. FIG. 3 is a first sequence diagram for describing the operations of the engine unit 200 according to the first embodiment.

In the image forming apparatus 100, when an instruction to read an original document is given, the engine CPU 204 sets parameters necessary for controlling the DRAM 203, in the memory write DMAC 232, the memory read DMAC 233, and the memory read DMAC 234 (steps S301 through S303).

Next, the engine CPU 204 reports an activation instruction to the memory write DMAC 232 (step S304). When the memory write DMAC 232 receives the activation instruction, the scanner 201 transfers the image data read from the original document, to the memory write DMAC 232 (step S305). The memory write DMAC 232 starts writing the received image data into the DRAM 203 (step S306).

When image data of a predetermined number of lines is stored in the DRAM 203, the engine CPU 204 reports an activation instruction to the memory read DMAC 233 (step S307). Note that the predetermined number of lines is, for example, the number of lines by which the ACS determination unit 216 can determine whether the image is a color image or not, and the number may be set in advance.

When the activation instruction is received, the memory read DMAC 233 gives an output instruction to output a value of the background level, to the background level holding unit 235 (step S308). When the output instruction is received, the background level holding unit 235 outputs the held value of the background level to the ACS determination unit 216 (step S309).

Furthermore, when the activation instruction is received, the memory read DMAC 233 starts reading the image data stored in the DRAM 203 (step S310). Then, the memory read DMAC 233 outputs (transfers) the read image data to the ACS determination unit 216 (step S311).

The ACS determination unit 216 determines whether the transferred image data is a color image or a monochrome image, and reports the determination result to the memory read DMAC 233 (step S312). When the determination result is received, the memory read DMAC 233 ends the transferring of the image data to the ACS determination unit 216. Furthermore, the ACS determination unit 216 reports the determination result to the engine CPU 204 (step S313).

When the determination result obtained by the ACS determination unit 216 is received, the engine CPU 204 sets parameters of image processing according to the determination result, in the image processing unit 218 (step S314). Note that in FIG. 3, the parameters relevant to image processing are set in the image processing unit 218; however, actually parameters relevant to image correction are also set in the color correction unit 219.

Next, the engine CPU 204 reports an activation instruction to the memory read DMAC 234 (step S315).

When the activation instruction is received, the memory read DMAC 234 starts reading the image data stored in the DRAM 203 (step S316). Then, the memory read DMAC 234 transfers the read image data to the image processing unit 218 (step S317).

Next, when image data of a predetermined number of lines is read (transferred) from the DRAM 203, the memory read DMAC 234 issues an interruption request to the engine CPU 204 (step S318). Note that the predetermined number of lines may be the same number of lines as the image data stored in the DRAM 203 in step S306, or a number of lines may be set in advance which is different from the number of lines in case of storing image data. In the present embodiment, one line may be set, as the different number of lines.

In the present embodiment, by setting one line as the number of lines of image data that is read until an interruption request is issued, it is possible to reduce the time until the image data of the next original document starts to be written in the DRAM 203, and the productivity can be increased. Note that in the present embodiment, the processing speed per pixel is higher in the engine processing unit 210 than in the scanner 201, and therefore even when the predetermined number of lines is set as one line in step S318, the image data stored in the DRAM 203 will not be overwritten.

When the interruption request is received, the engine CPU 204 reports an activation instruction to the memory write DMAC 232 (step S319).

When the memory write DMAC 232 is activated, the scanner 201 reads the next original document, and transfers the image data to the memory write DMAC 232 (step S320).

The processes from step S320 through S332 are the same as the processes from step S305 through S317, and therefore descriptions thereof are omitted.

Figure 4:
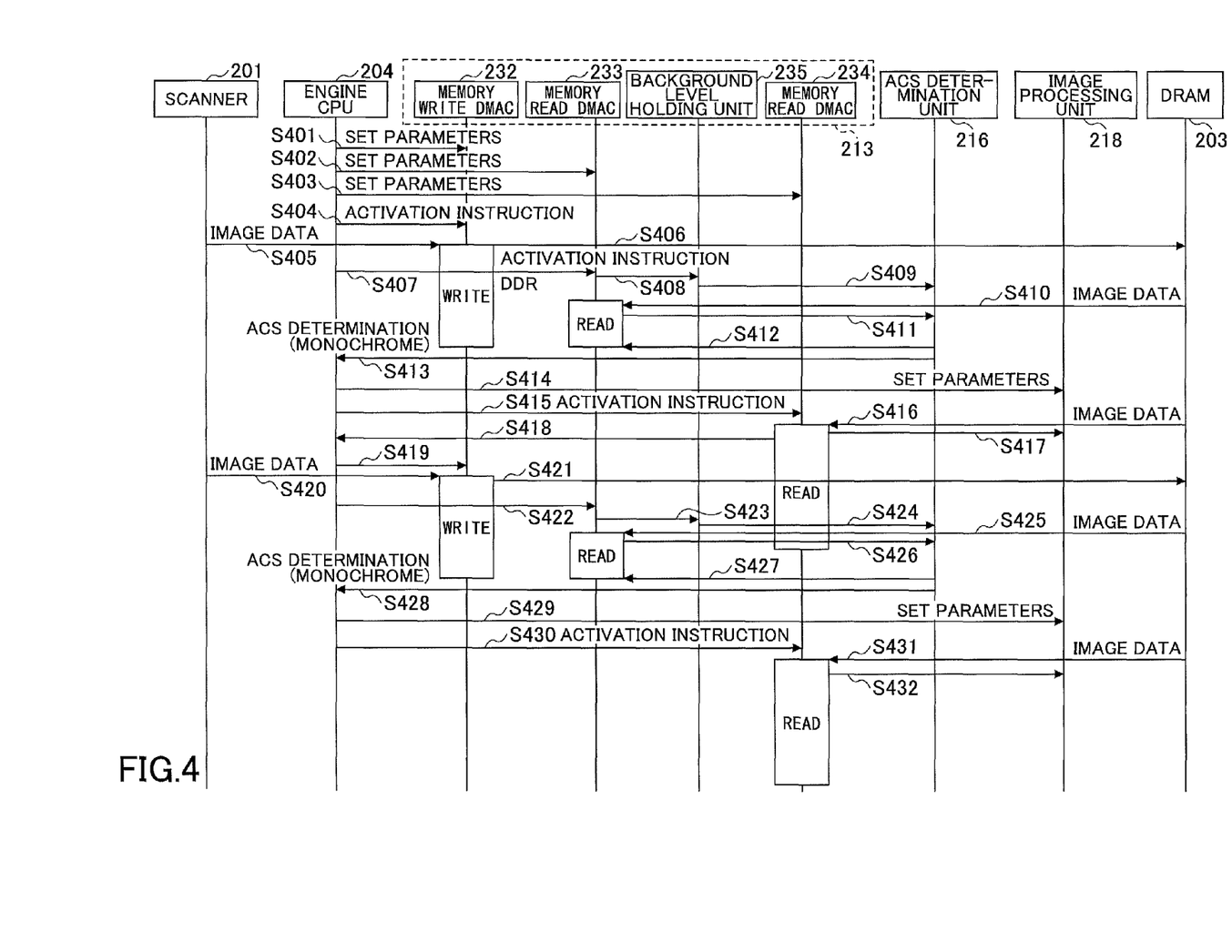
FIG. 4 is a second sequence diagram for describing the operations of the engine unit according to the first embodiment.

Next, with reference to FIG. 4, a description is given of a process performed by the engine unit 200, when the image forming apparatus 100 performs copying of a monochrome original document. FIG. 4 is a second sequence diagram for describing the operations of the engine unit 200 according to the first embodiment.

The processes from step S401 through S411 of FIG. 4 are the same as the processes from step S301 through S311 of FIG. 3, and therefore descriptions thereof are omitted.

When the memory read DMAC 233 completes reading one page of the original document worth of image data from the DRAM 203, and the image is determined not to be a color image, the ACS determination unit 216 determines that the image is a monochrome image, and reports the determination result to the memory read DMAC 233 (step S412). Furthermore, the ACS determination unit 216 reports the determination result to the engine CPU 204 (step S413).

The processes from step S414 through S432 of FIG. 4 are the same as the processes from step S314 through S332 of FIG. 3, and therefore descriptions thereof are omitted.

As described above, in the present embodiment, when the determination result obtained by the ACS determination unit 216 is reported to the engine CPU 204, the memory read DMAC 234 immediately transfers the image data stored in the DRAM 203, to the image processing unit 218. Therefore, in the present embodiment, it is possible to reduce the time until image processing starts, and increase the productivity. Particularly, in the present embodiment, the productivity is increased even more when the image of the original document is a color image.

Furthermore, in the present embodiment, when a predetermined number of lines of the image data stored in the DRAM 203 is transferred to the image processing unit 218, the image data of the next original document starts to be written in the DRAM 203, and furthermore, the image data starts to be transferred to the ACS determination unit 216.

Figure 5:
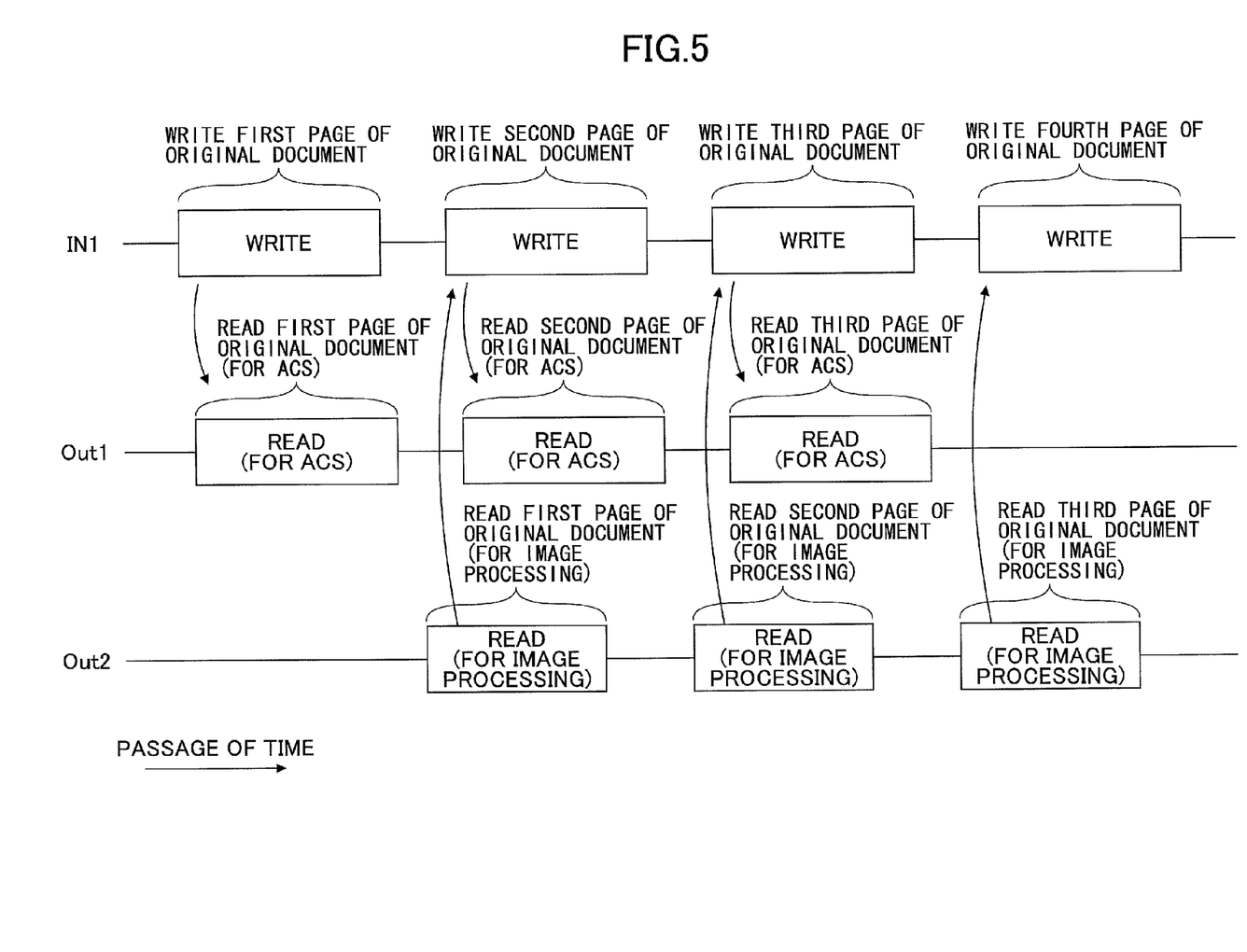
FIG. 5 illustrates the effects of the first embodiment.

In the following, the effects of the present embodiment are further described with reference to FIG. 5. FIG. 5 illustrates the effects of the first embodiment.

In the image forming apparatus 100 according to the present embodiment, when the image data of the first page of the original document read by the scanner 201 is input from the input terminal IN1, the DMAC 213 writes the image data in the DRAM 203 by the memory write DMAC 232. Then, when the writing of the predetermined number of lines is completed, the DMAC 213 reads the image data written in the DRAM 203 by the memory read DMAC 233, and outputs the image data to the ACS determination unit 216 from the output terminal Out1.

Furthermore, when the determination by the ACS determination unit 216 is completed, the DMAC 213 according to the present embodiment reads the image data written in the DRAM 203 by the memory read DMAC 234, and outputs the image data to the image processing unit 218 from the output terminal Out2.

In the present embodiment, while the image data is being output from the output terminal Out2, the image data of the second page of the original document is input to the DMAC 213 from the input terminal IN1.

Then, similar to the case of the image data of the first page of the original document, when the writing of the predetermined number of lines is completed, the DMAC 213 starts to output the image data of the second page of the original document to the ACS determination unit 216 from the output terminal Out1. At this time, the image data of the first page of the original document is output to the image processing unit 218 from the output terminal Out2.

As described above, the DMAC 213 according to the present embodiment has output terminals of two systems, and therefore while the image data of the Nth page of the original document is being transferred to the image processing unit 218, it is possible to transfer the image data of the N+1th page of the original document to the ACS determination unit 216. Therefore, in the present embodiment, it is possible to perform the image processing of the image data of the Nth page of the original document and the ACS determination of the image data of the N+1th page of the original document in parallel, and therefore, it is possible to increase the productivity in the process of, for example, copying a plurality of pages of an original document.

Second Embodiment

In the following, a description is given of a second embodiment with reference to drawings. The image forming apparatus according to the present embodiment is different from that of the first embodiment only in that a plurality of scanners are included. Thus, in the following description of the second embodiment, only the points that are different from those of the first embodiment are described, and the same functional elements as those of the first embodiment are denoted by the same reference numerals and descriptions thereof are omitted.

Figure 6:
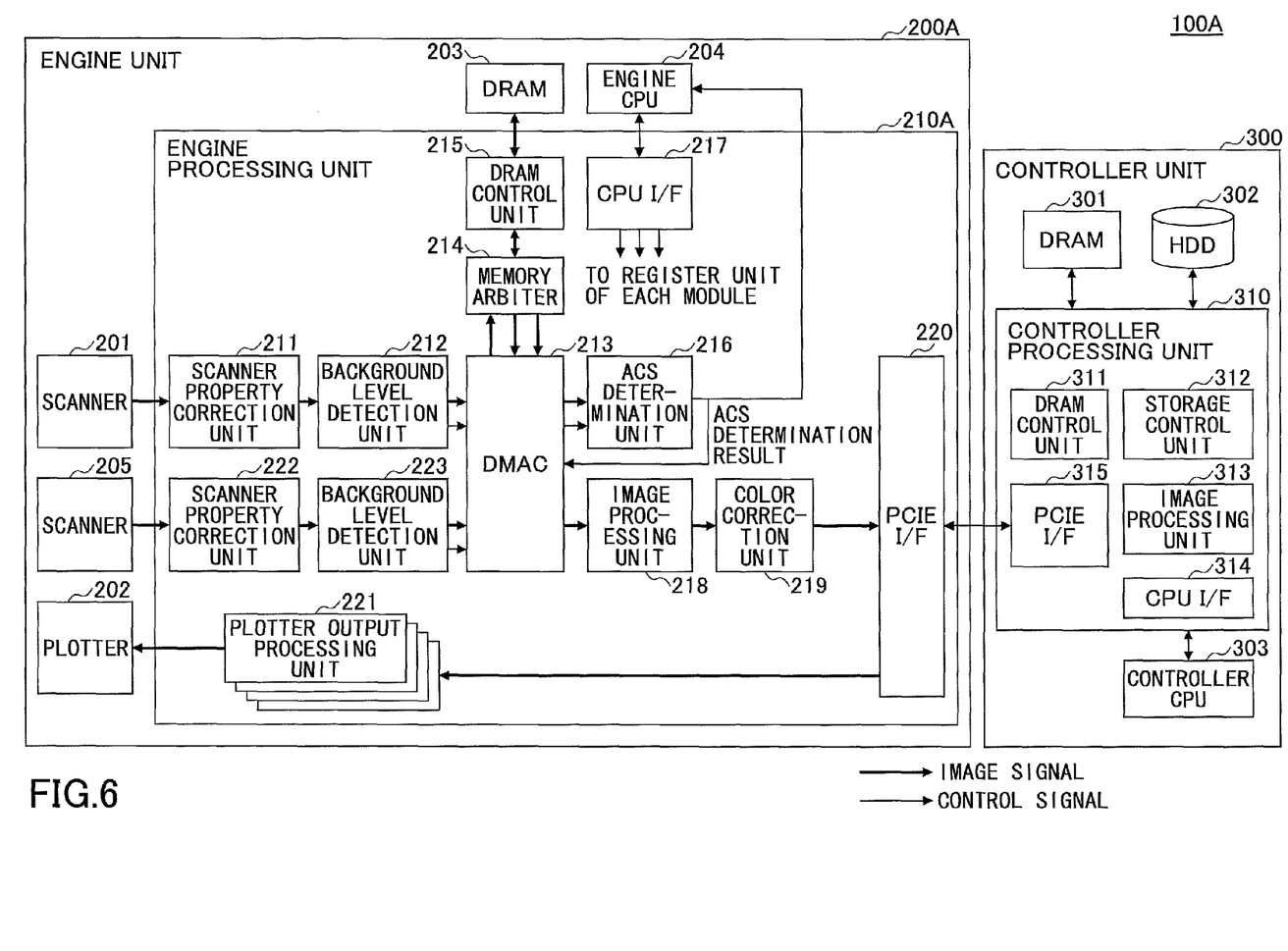
FIG. 6 illustrates an image forming apparatus according to a second embodiment.

FIG. 6 illustrates an image forming apparatus according to the second embodiment. The image forming apparatus 100A according to the present embodiment includes an engine unit 200A and the controller unit 300. The engine unit 200A includes the scanner 201, a scanner 205, and an engine processing unit 210A.

Among the scanners 201, 205 according to the present embodiment, for example, one may be using a CCD (Charge Coupled Device) sensor, and the other may be using a CIS (Contact Image Sensor), or both may be using a CCD sensor.

The image forming apparatus 100A according to the present embodiment includes a plurality of scanners 201, 205, and is thus capable of scanning both sides of an original document.

The engine processing unit 210A according to the present embodiment includes a DMAC 213A, the units included in the engine processing unit 210 of the first embodiment, and additionally, a scanner property correction unit 222, and a background level detection unit 223.

The scanner property correction unit 222 performs corrections according to the properties of the scanner 205. The background level detection unit 223 detects the background density of the original document read by the scanner 205, and transfers the detected value of the background level to the DMAC 213A.

Figure 7:
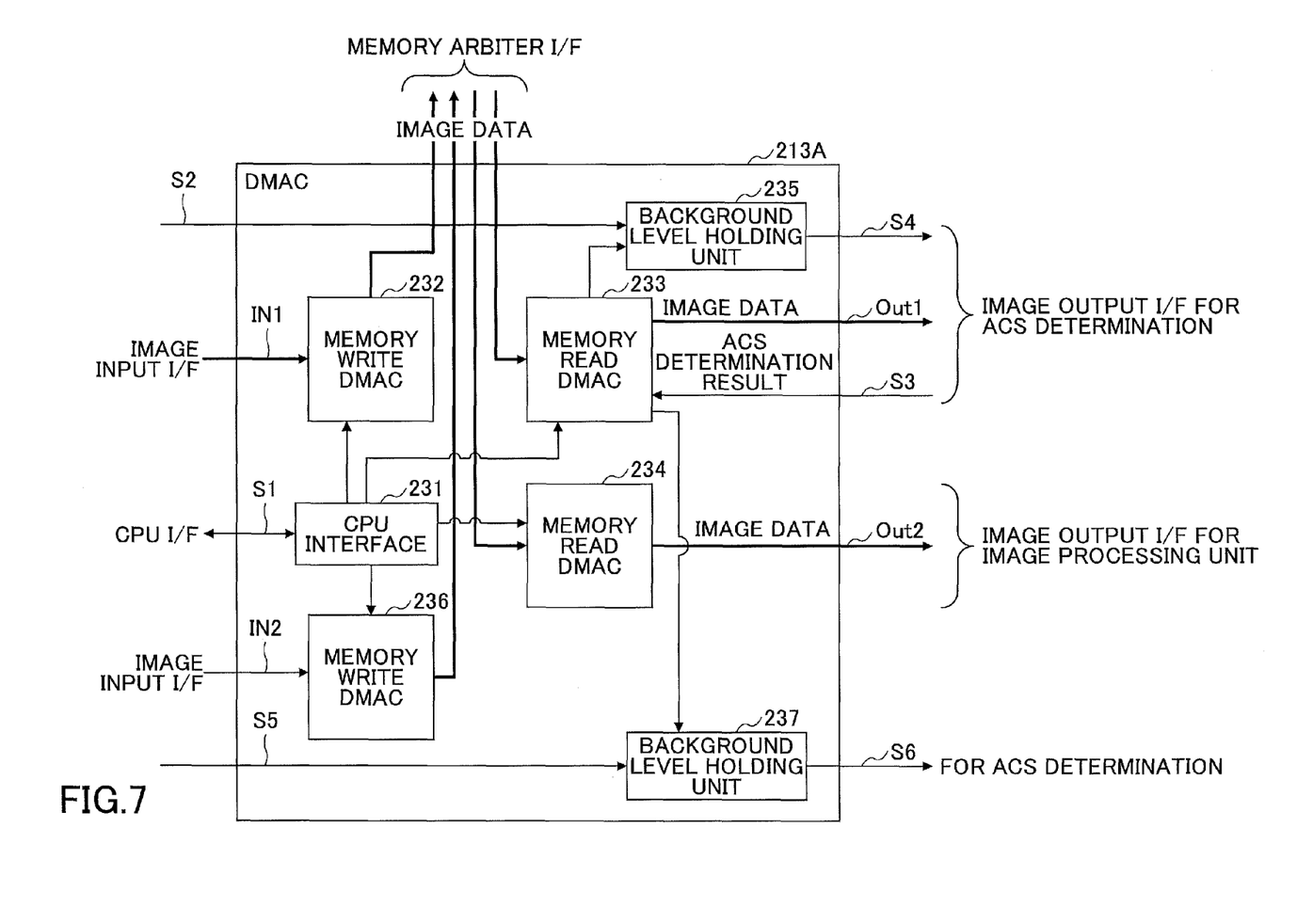
FIG. 7 illustrates a DMAC according to the second embodiment.

FIG. 7 illustrates the DMAC 213A according to the second embodiment. The DMAC 213A according to the present embodiment includes the elements included in the DMAC 213 of the first embodiment, and additionally, input terminals IN2, S5, an output terminal S6, a memory write DMAC 236, and a background level holding unit 237.

The memory write DMAC 236 according to the present embodiment controls the operation of writing the image data read by the scanner 205, into the DRAM 203.

The background level holding unit 237 holds the value of the background level detected by the background level detection unit 223.

In the following, a description is given of an example of operations by the DMAC 213A according to the present embodiment, in a case where the scanner 201 reads an image on the front side of the original document and the scanner 205 reads an image on the back side of the original document.

In the DMAC 213A according to the present embodiment, when parameters are set in each DMAC by the engine CPU 204, and an activation instruction for the memory write DMAC 232 is received, image data is input from the input terminal IN1.

In the DMAC 213A, when the memory write DMAC 232 completes writing a predetermined number of lines worth of image data into the DRAM 203, the engine CPU 204 receives an activation instruction to activate the memory read DMAC 233. When the memory read DMAC 233 is activated, the memory read DMAC 233 reads the image data written into the DRAM 203, and outputs the image data that has been read to the ACS determination unit 216 from the output terminal Out1. Furthermore, the memory read DMAC 233 outputs the value of the background level held in the background level holding unit 235 to the ACS determination unit 216 from the output terminal S4.

When the determination result obtained by the ACS determination unit 216 is reported to the engine CPU 204 and the memory read DMAC 233, the engine CPU 204 activates the memory read DMAC 234, and outputs the image data written into the DRAM 203 to the image processing unit 218 from the output terminal Out2.

Next, when the memory read DMAC 234 completes outputting a predetermined number of lines worth of image data, the engine CPU 204 activates the memory write DMAC 236. When the memory write DMAC 236 is activated, the memory write DMAC 236 writes the image data input from the input terminal IN2, into the DRAM 203.

When the memory write DMAC 236 completes writing a predetermined number of lines worth of image data, the engine CPU 204 activates the memory read DMAC 233. When the memory read DMAC 233 is activated, the memory read DMAC 233 outputs the image data written into the DRAM 203 to the ACS determination unit 216 from the output terminal Out1. Furthermore, the memory read DMAC 233 outputs the value of the background level held in the background level holding unit 237, to the ACS determination unit 216.

The DMAC 213A according to the present embodiment repeats the above process. That is, when the DMAC 213A according to the present embodiment writes image data into the DRAM 203, the writing by the memory write DMAC 232 and the writing by the memory write DMAC 236 are alternately performed. Furthermore, similar to the first embodiment, the memory read DMAC 233 and the memory read DMAC 234 according to the present embodiment output the image data read from the DRAM 203 to the ACS determination unit 216 and the image processing unit 218, respectively. Note that in the DMAC 213A according to the present embodiment, it is preferable that the memory read DMAC 233 receives, via the CPU interface 231, information indicating which page of the original document and also which side (front or back) of the page is represented by the image data written in the DRAM 203.

In the present embodiment, by the above operations, in the process of, for example, double-sided copying, it is possible to perform the image processing of the image data of the back side of the Nth page of the original document and the ACS determination of the image data of the front side of the N+1th page of the original document in parallel, and therefore it is possible to increase the productivity also in the case of double-sided copying.

Third Embodiment

In the following, a description is given of a third embodiment with reference to drawings. The third embodiment is different from the first embodiment in that a parameter DMAC for setting parameters in the image processing unit 218 and the color correction unit 219, is provided. Thus, in the following description of the third embodiment, only the points that are different from those of the first embodiment are described, and the same functional elements as those of the first embodiment are denoted by the same reference numerals and descriptions thereof are omitted.

Figure 8:
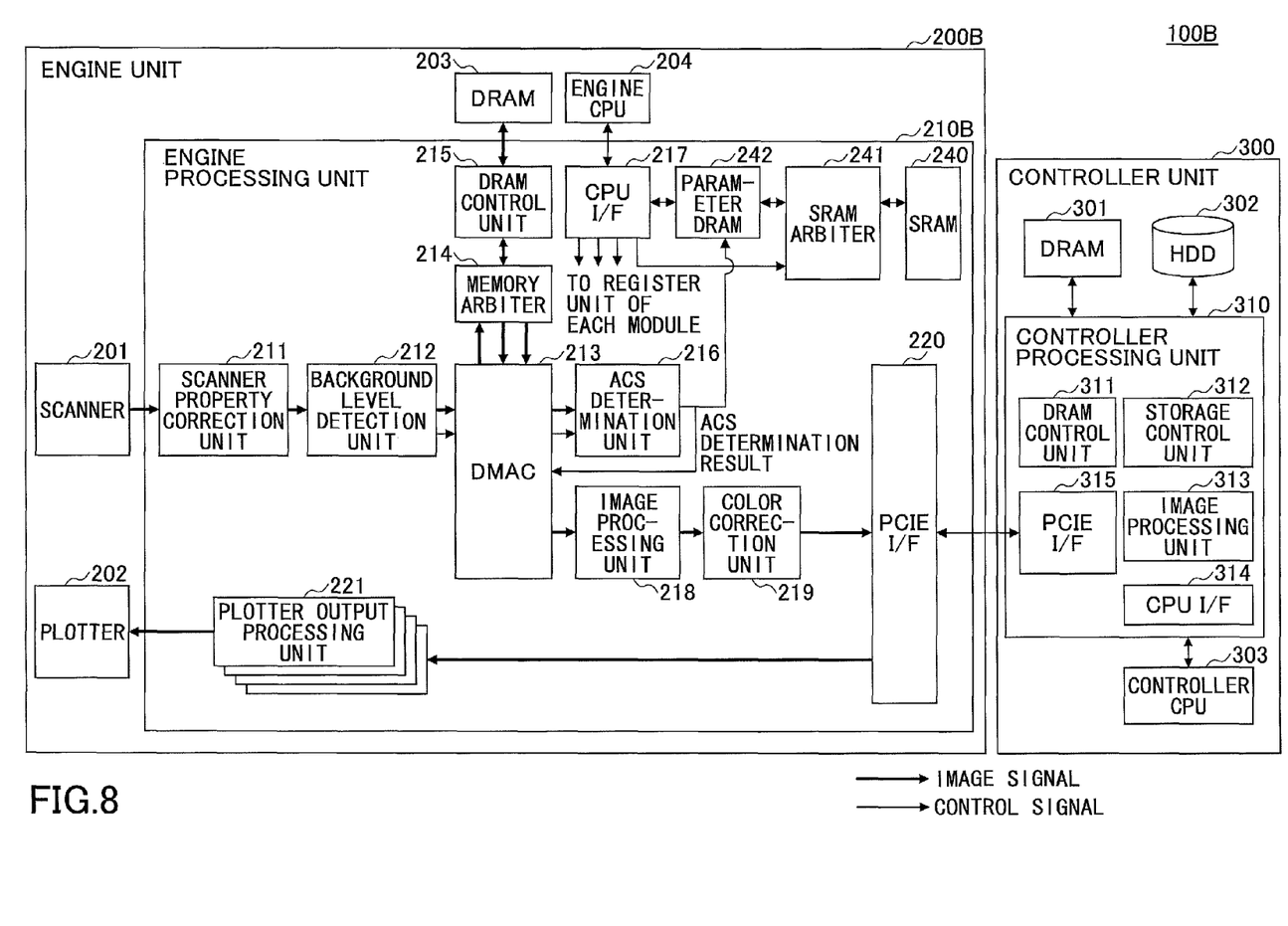
FIG. 8 illustrates an image forming apparatus according to a third embodiment.

FIG. 8 illustrates an image forming apparatus according to the third embodiment. An image forming apparatus 100B according to the present embodiment includes an engine unit 200B and the controller unit 300.

The engine unit 200B according to the present embodiment includes an engine processing unit 210B. The engine processing unit 210B according to the present embodiment includes the units included in the engine processing unit 210 of the first embodiment, and additionally, a SRAM (Static Random Access Memory) 240, a SRAM arbiter 241, and a parameter DRAM 242.

The SRAM 240 stores, in advance, parameters that are to be set in the image processing unit 218 and the color correction unit 219, for both the case where the image is a color image and the case where the image is a monochrome image. The parameters stored in the SRAM 240 are written in by the engine CPU 204.

The SRAM arbiter 241 controls the access to the SRAM 240 by the parameter DRAM 242.

The parameter DRAM 242 receives the determination result of the ACS determination unit 216, reads parameters according to the determination result from the SRAM 240, and sets the parameters in the registers of the image processing unit 218 and the color correction unit 219 via the CPU interface 217. The parameter DRAM 242 according to the present embodiment may be a general DRAM.

In the present embodiment, by using the parameter DRAM 242, it is possible to set parameters without the intervention of the engine CPU 204, and therefore parameters can be set at a higher speed compared to the case of setting parameters by the engine CPU 204.

Furthermore, in the present embodiment, the parameter DRAM 242 sets the parameters, and therefore the load of processes by the engine CPU 204 can be reduced.

Fourth Embodiment

In the following, a description is given of a fourth embodiment with reference to drawings. The fourth embodiment is different from the first embodiment in that the transfer of image data from the DMAC to the ACS determination unit and the image processing unit is done by output of a single system. In the following description of the fourth embodiment, only the points that are different from those of the first embodiment are described, and the same functional elements as those of the first embodiment are denoted by the same reference numerals and descriptions thereof are omitted.

Figure 9:
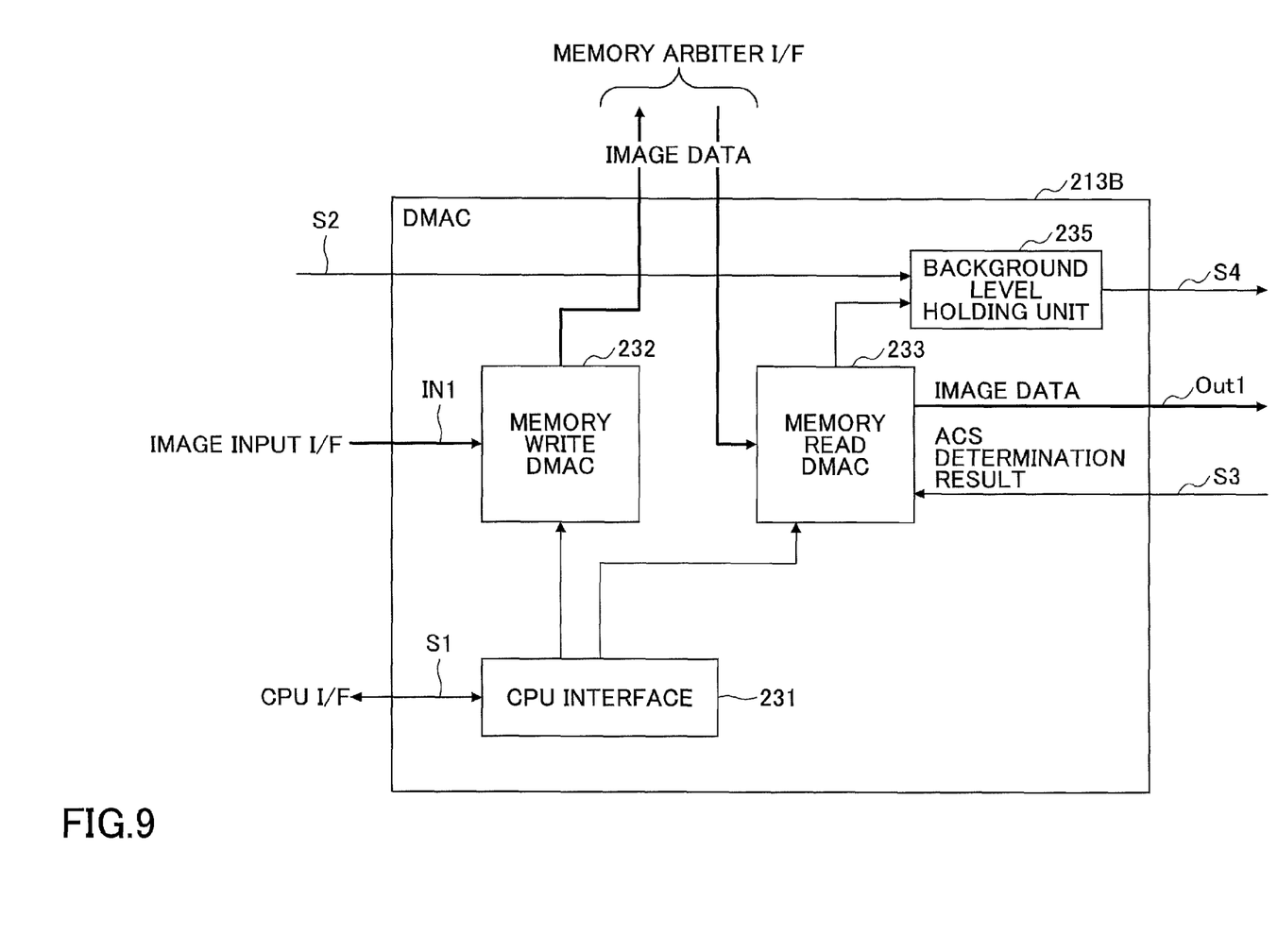
FIG. 9 illustrates a DMAC according to a fourth embodiment.

FIG. 9 illustrates a DMAC according to the fourth embodiment.

A DMAC 213B according to the present embodiment includes a CPU interface 231, a memory write DMAC 232, a memory read DMAC 233, and a background level holding unit 235. Furthermore, the DMAC 213B according to the present embodiment includes input terminals IN1, S1, S2, S3 and output terminals Out1, S4.

Figure 10:
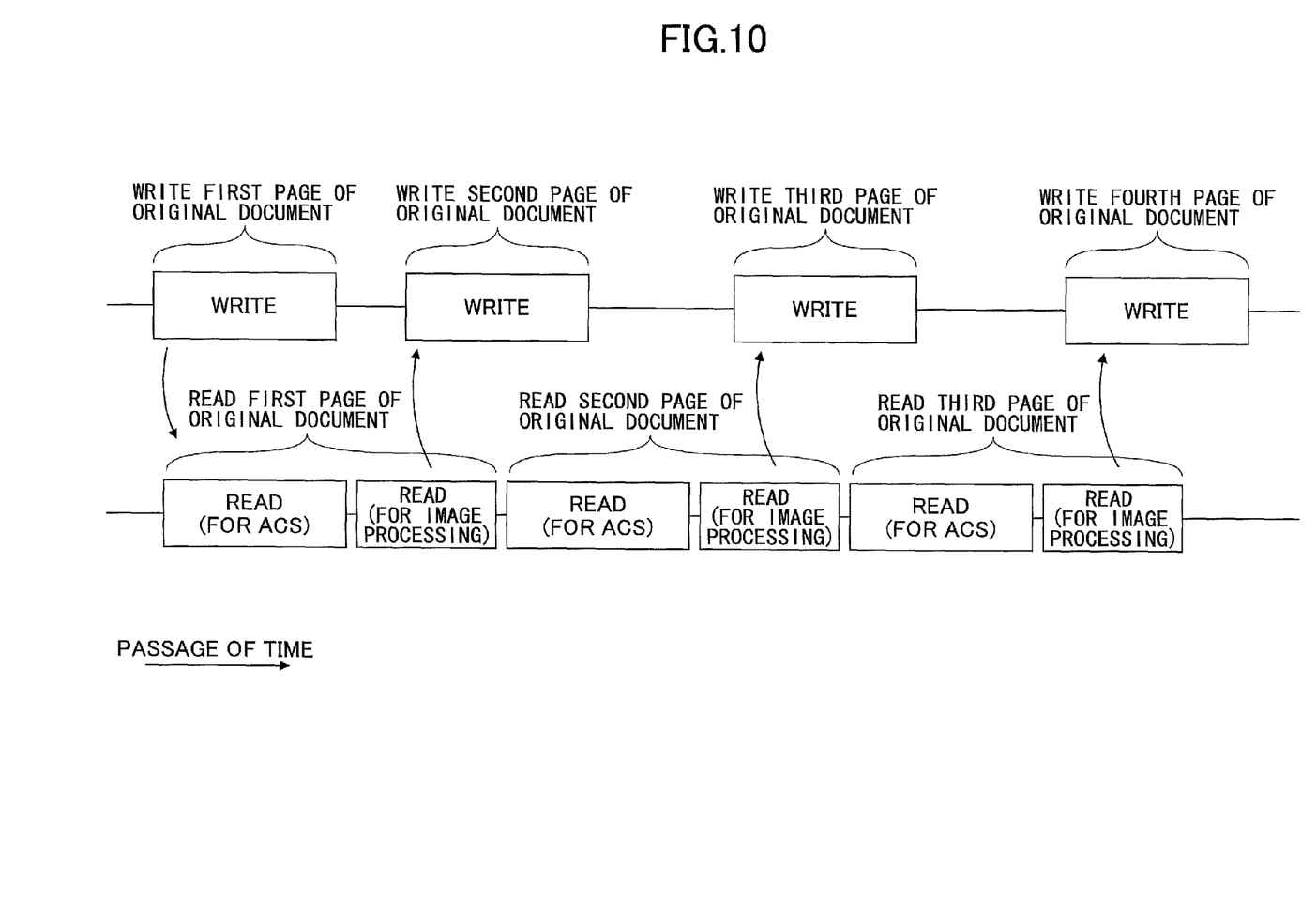
FIG. 10 illustrates the operations of the DMAC according to the fourth embodiment.

FIG. 10 illustrates the operations of the DMAC according to the fourth embodiment. In the DMAC 213B according to the present embodiment, when the memory write DMAC 232 is activated by the engine CPU 204, the memory write DMAC 232 writes image data into the DRAM 203.

When writing of a predetermined number of lines worth of image data into the DRAM 203 is completed, the engine CPU 204 activates the memory write DMAC 232, and transfers the image data to the ACS determination unit 216 from the output terminal Out1. At this time, the memory write DMAC 232 transfers the value of the background level held in the background level holding unit 235, to the ACS determination unit 216.

Then, when the memory write DMAC 232 receives a report of the determination result obtained by the ACS determination unit 216, the DMAC 213B reads the image again from the DRAM 203, and transfers the image data to the image processing unit 218 from the output terminal Out1.

When transfer of a predetermined number of lines worth of image data to the image processing unit 218 is completed, the engine CPU 204 activates the memory write DMAC 232. When the memory write DMAC 232 is activated, the memory write DMAC 232 writes the image data input from the input terminal IN1, into the DRAM 203.

As described above, in the present embodiment, the transfer of image data to the ACS determination unit 216 and the transfer of image data to the image processing unit 218 are sequentially executed.

Here, focus is made on the ACS determination by the ACS determination unit 216 according to the present embodiment. In the present embodiment, the DRAM 203, which is an image memory in which the image data read by the scanner 201 is stored, is provided at the stage before the ACS determination unit 216. Furthermore, in the present embodiment, the background level detection unit 212 is also provided at the stage before the ACS determination unit 216.

As described above, in the present embodiment, by providing the DRAM 203 and the background level detection unit 212 at the stage before the ACS determination unit 216, it is possible to detect the value of the background level of the image data before performing ACS determination.

Therefore, in the present embodiment, it is possible to provide information of the color of the background of the original document to the ACS determination unit 216, and therefore the precision of the determination by the ACS determination unit 216 can be increased.

Specifically, for example, a case where the color of the background of the original document is light blue is considered. In this case, in the present embodiment, the background level detection unit 212 detects that light blue is the color of the background of the original document. Therefore, the ACS determination unit 216 according to the present embodiment is able to ignore the color of the background of the original document, and determine whether the image of the original document is a color image or a monochrome image.

Conversely, when the background level detection unit 212 and the DRAM 203 are provided at a stage after the ACS determination unit 216, even though the image of the original document is a monochrome image, the ACS determination unit 216 may detect the color of the background of the original document and erroneously determine that the image of the original document is a color image.

In the present embodiment, the background level detection unit 212 and the DRAM 203 are provided at a stage before the ACS determination unit 216, and the value of the background level is reported to the ACS determination unit 216, and therefore the ACS determination unit 216 is able to perform ACS determination by ignoring the color of the background. Therefore, in the present embodiment, the precision of determination by the ACS determination unit 216 can be increased.

According to one embodiment of the present invention, a memory control circuit and an image forming apparatus are provided, which are capable of increasing the productivity.

The memory control circuit and the image forming apparatus are not limited to the specific embodiments described herein, and variations and modifications may be made without departing from the spirit and scope of the present invention.

The present application is based on and claims the benefit of priority of Japanese Priority Patent Application No. 2014-221790, filed on Oct. 30, 2014, the entire contents of which are hereby incorporated herein by reference.

What is claimed is:

1. A memory control circuit comprising:
a memory that store a program, and
a processor that is configured to execute the program so as to:
  receive image data of a page n within an original script that is input and write the image data of the page n within the original script into the memory;
  read the image data of the page n within the original script written in the memory and output the image data of the page n within the original script to a determination unit that determines a type of image of the image data;
  read the image data of the page n within the original script written in the memory and output the image data of the page n within the original script to an image processing unit that at least performs image processing according to a determination result obtained by the determination unit, and
  when outputting the image data of the page n within the original script to the image processing unit, start outputting image data of a page n+1 within the original script, which is input subsequently to the input of the image data, to the determination unit.

2. The memory control circuit according to claim 1, wherein when writing of a predetermined number of lines worth of the image data is completed, the memory control circuit is configured to start reading the image data from the memory.

3. The memory control circuit according to claim 1, wherein when a report of the determination result obtained by the determination unit is received by the memory control circuit, the memory control circuit is activated and starts reading the image data, and when reading of a predetermined number of lines worth of the image data is completed by the memory control circuit, the memory control circuit receives image data, which is input subsequently to the input of the image data.

4. The memory control circuit according to claim 2, wherein the memory control circuit is further configured to hold a value of a background level of the image data, the value being detected from the image data, wherein when writing of a predetermined number of lines worth of the image data is completed, the memory control circuit causes the value of the background level to be output from the memory control circuit to the determination unit.

5. The memory control circuit according to claim 1, wherein the memory control circuit is further configured to write, after writing the image data into the memory, image data, which is input to the memory control circuit, into the memory.

6. The memory control circuit according to claim 1, wherein the memory control circuit is further configured to output the image data of the page n+1 of the original script to the determination unit via a first output terminal, and further configured to output the image data of the page n of the original script to the image processing unit via a second output terminal.

7. The memory control circuit according to claim 1, wherein the memory control circuit is further configured to start receiving the image data of the page n+1 of the original script while outputting the image data of the page n of the original script to the determination unit.

8. The memory control circuit according to claim 6, wherein the memory control circuit is further configured to start receiving the image data of the page n+1 of the original script while outputting the image data of the page n of the original script to the determination unit.

9. The memory control circuit according to claim 1, wherein the page n and the page n+1 of the original script consist of front and back faces of one sheet in the original script.

10. An image forming apparatus comprising:

a memory control circuit comprising a memory that is configured to store a program, and a processor that is configured to execute the program so as to:

receive image data of a page n of an original script that is input and write the image data of the page n within the original script into the memory, read the image data of the page n within the original script written in the memory and output the image data of the page n within the original script to a determination unit that determines a type of image of the image data, and read the image data of the page n within the original script written in the memory and output the image data of the page n within the original script to an image processing unit that at least performs image processing according to a determination result obtained by the determination unit, and when outputting the image data of the page n within the original script to the image processing unit, start outputting image data of a page n+1 within the original script, which is input subsequently to the input of the image data, to the determination unit.

11. The image forming apparatus according to claim 10, wherein the determination unit is provided at a stage before the memory control circuit.

12. A memory control method performed by a memory control circuit including the steps of:

receiving image data of a page n within an original script that is input and write the image data of the page n within the original script into a memory;

a first reading step for reading the image data of the page n within the original script written in the memory and outputting the image data of the page n within the original script to a determination unit that determines a type of image of the image data; and a second reading step for reading the image data of the page n within the original script written in the memory and outputting the image data of the page n within the original script to an image processing unit that at least performs image processing according to a determination result obtained by the first reading step, wherein the method further includes starting outputting image data of a page n+1 within the original script, which is input subsequently to the input of the image data, to the determination unit when outputting the image data of the page n within the original script to the image processing unit.

13. The memory control method according to claim 12, wherein the method further include outputting the image data of the page n+1 of the original script to the determination unit via a first output terminal, and further outputting the image data of the page n of the original script to the image processing unit via a second output terminal.

14. The memory control method according to claim 12, wherein the method further include starting receiving the image data of the page n+1 of the original script while outputting the image data of the page n of the original script to the determination unit.

15. The memory control method according to claim 13, wherein the method further includes starting receiving the image data of the page n+1 of the original script while outputting the image data of the page n of the original script to the determination unit.

16. The memory control method according to claim 12, wherein the page n and the page n+1 of the original script consist of front and back faces of one sheet in the original script.

17. The memory control method according to claim 12, wherein the method further includes:

activating the memory control circuit and starting reading the image data when receiving a report of the determination result obtained by the determination unit, and receiving image data, which is input subsequently to the input of the image data when reading of a predetermined number of lines worth of the image data is completed by the memory control circuit.

18. The memory control method according to claim 12, wherein the memory control method further includes:

holding a value of a background level of the image data, the value being detected from the image data, and causing the value of the background level to be output from the background level holding unit to the determination unit when writing of a predetermined number of lines worth of the image data is completed.

19. The memory control method according to claim 12, wherein the memory control method further includes writing, after the writing unit has written the image data into the memory, image data, which is input to the memory control circuit, into the memory.

20. An image forming method performed by an image forming apparatus including the memory control circuit including the steps of:
receiving image data of a page n within an original script that is input and write the image data of the page n within the original script into a memory;
a first reading step for reading the image data of the page n within the original script written in the memory and outputting the image data of the page n within the original script to a determination unit that determines a type of image of the image data;
a second reading step for reading the image data of the page n within the original script written in the memory and outputting the image data of the page n within the original script to an image processing unit that at least performs image processing according to a determination result obtained by the first reading step, and
starting outputting image data of a page n+1 within the original script, which is input subsequently to the input of the image data, to the determination unit when outputting the image data of the page n within the original script to the image processing unit.

21. The image forming method according to claim 20, wherein the determination unit is provided at a stage before the memory control circuit.

* * * * *